US010018161B2

(12) United States Patent
Anderson et al.

(10) Patent No.: US 10,018,161 B2
(45) Date of Patent: Jul. 10, 2018

(54) FUEL VAPOR RECOVERY SYSTEM

(71) Applicant: Stant USA Corp., Connersville, IN (US)

(72) Inventors: John B. Anderson, Liberty, IN (US); Matthew F. Bischoff, Brookville, IN (US); John C. Long, II, Auburn Hills, MI (US); Michael S. Brock, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 15/292,678

(22) Filed: Oct. 13, 2016

(65) Prior Publication Data

US 2017/0122267 A1     May 4, 2017

Related U.S. Application Data

(60) Provisional application No. 62/240,792, filed on Oct. 13, 2015.

(51) Int. Cl.
| | |
|---|---|
| *F02M 33/02* | (2006.01) |
| *F02M 25/08* | (2006.01) |
| *F02M 35/10* | (2006.01) |
| *B60K 15/035* | (2006.01) |
| *B01D 53/04* | (2006.01) |

(52) U.S. Cl.
CPC ..... *F02M 25/0854* (2013.01); *B01D 53/0407* (2013.01); *B01D 53/0454* (2013.01); *B60K 15/03504* (2013.01); *F02M 25/089* (2013.01); *F02M 35/10222* (2013.01); *B01D 2253/102* (2013.01); *B01D 2259/4516* (2013.01); *B60K 15/03519* (2013.01); *B60K 2015/03514* (2013.01)

(58) Field of Classification Search
CPC ............. F02M 25/0854; F02M 25/089; F02M 25/0836; F02M 25/0872; F02M 35/10222; B01D 53/0407; B01D 53/0454; B01D 2259/4516; B01D 2253/102; B60K 15/03504; B60K 15/03519; B60K 2015/03514
USPC ................................ 123/516, 518, 519, 520
See application file for complete search history.

(56) References Cited

U.S. PATENT DOCUMENTS

| | | | |
|---|---|---|---|
| 5,111,795 A * | 5/1992 | Thompson | ......... F02M 25/0872 123/519 |
| 7,228,850 B2 | 6/2007 | King | |
| 7,255,094 B2 | 8/2007 | King | |
| 7,409,946 B2 | 8/2008 | King | |
| 7,527,044 B2 | 5/2009 | Dunkle et al. | |
| 8,215,290 B2 | 7/2012 | Dunkle et al. | |
| 9,359,977 B2 * | 6/2016 | Brock | ................ F02M 25/0854 |
| 9,611,814 B2 * | 4/2017 | Dudar | ................ F02M 25/0836 |
| 9,694,310 B2 * | 7/2017 | Anderson | .......... B01D 53/0446 |
| 9,732,685 B2 * | 8/2017 | Dudar | ................. F02D 41/0032 |
| 2009/0139495 A1 | 6/2009 | Crawford | |
| 2016/0038870 A1 | 2/2016 | Anderson et al. | |

* cited by examiner

*Primary Examiner* — Hai Huynh
(74) *Attorney, Agent, or Firm* — Barnes & Thornburg LLP

(57) ABSTRACT

A vehicle fuel system includes a vapor recovery canister containing a primary carbon bed and a secondary carbon bed. Each carbon bed is configured to capture hydrocarbon material associated with fuel vapor discharged from a vehicle fuel tank.

22 Claims, 16 Drawing Sheets

FUEL VAPOR RECOVERY SYSTEM

PRIORITY CLAIM

This application claims priority under 35 U.S.C. § 119(e) to U.S. Provisional Application Ser. No. 62/240,792, filed Oct. 13, 2015, which is expressly incorporated by reference herein

BACKGROUND

The present disclosure relates to a vehicle fuel system, and particularly to a fuel vapor venting system associated with a vehicle fuel tank. More particularly, the present disclosure relates to fuel vapor recovery canisters included in fuel vapor venting systems.

Vehicle fuel systems are configured to vent pressurized or displaced fuel vapor from the vapor space in the fuel tank to a separate charcoal canister. The canister is designed to capture and store hydrocarbons entrained in fuel vapors that are displaced and generated in the fuel tank and then discharge filtered air from the canister to the atmosphere. More specifically, during venting, hydrocarbons carried in the fuel vapor are stored (e.g., adsorbed) on charcoal held in the canister.

Fuel vapor is vented from the fuel tank into the canister during fuel tank refueling when a vehicle engine is off as the incoming fuel displaces fuel vapor within the fuel tank. In addition, fuel vapor is frequently vented from the fuel tank during normal operation of the vehicle fuel system as a consequence of daily rising atmospheric temperatures around the fuel tank that cause expansion of fuel and fuel vapor stored in the fuel tank.

A purge vacuum is applied to the canister when the vehicle engine is running via an engine intake manifold coupled to the canister. Hydrocarbons stored on charcoal held in the canister are entrained in a stream of atmospheric air drawn into the canister by the purge vacuum. This produces a stream of fuel vapor laden with reclaimed hydrocarbon material that is discharged through a purge hose into the intake manifold for combustion in the engine.

SUMMARY

A fuel vapor canister system in accordance with the present disclosure includes a primary recovery canister designed to capture and store hydrocarbons entrained in fuel vapors that are discharged from a fuel tank toward the atmosphere. The primary recovery canister includes a first carbon bed contained in a primary filter bed housing. The primary filter bed housing includes an inlet adapted to be coupled to a tank vent control system coupled to a fuel tank and to an intake manifold coupled to a vehicle engine. The primary filter bed housing also includes an outlet adapted to communicate, directly or indirectly, with atmospheric air located outside of the canister system.

In illustrative embodiments, the canister system includes a modular secondary recovery canister that coupled to the primary recovery canister to capture and store additional hydrocarbons entrained in fuel vapors that are discharged from a fuel tank during daily expansion of fuel/fuel vapor caused by heating of the fuel tank during the warm temperatures of the day. The modular secondary recovery canister includes a second carbon bed contained in a second filter bed housing. The modular secondary recovery canister also includes a vapor flow controller adapted to control the movement of fuel vapor through the modular secondary recovery canister so that the fuel vapor is directed to interact with the second carbon bed during daily expansion of fuel/fuel vapor but is directed to bypass the second carbon bed during refueling of the fuel tank to keep activated charcoal in the second carbon bed relatively clean for later use in capturing hydrocarbons discharged during daily expansion of fuel in the fuel tank.

In illustrative embodiments, the vapor flow controller comprises a bypass valve adapted to open and allow fuel vapor to pass along a first flow path from an inlet of the modular secondary filter bed housing to the atmosphere during refueling without passing through the second carbon bed. By allowing the movement of fuel vapor directly to atmosphere without interaction with the second carbon bed during refueling, the second carbon bed remains substantially clean for use during normal operation of the fuel system. During normal operation, the bypass valve is adapted to close and block fuel vapor from passing from the inlet of the modular secondary filter bed housing to the atmosphere without passing through the second carbon bed so that any fuel vapor moving through the canister system must pass along a second flow path through both the first carbon bed located in the primary filter bed housing and the second carbon bed before being discharged into the atmosphere.

In illustrative embodiments, the bypass valve moves from being normally closed to open when (1) a fuel tank closure is opened by a user removing a fuel cap and (2) pressure in the fuel tank is above atmospheric pressure. The bypass valve includes an outlet tube, a flexible diaphragm, and a spring. The outlet tube provides a passageway for fuel vapor flowing into the inlet of the modular secondary filter bed housing toward the second carbon bed to bypass the second carbon bed and flow directly to atmosphere. A first side of the flexible diaphragm is exposed to pressure from the fuel tank and normally engages the outlet tube to block fuel vapor from moving into the outlet tube and bypassing the second carbon bed. A second side of the flexible diaphragm, opposite the first side, is exposed to pressure from the fuel tank when the fuel tank closure is closed and is exposed to atmospheric pressure when the fuel tank closure is opened by a user removing a fuel cap. If fuel tank pressure is greater than atmospheric pressure when the fuel tank closure is opened, as is typical during refueling, the flexible diaphragm bends out of engagement with the outlet tube to allow fuel vapor to move into the outlet tube and bypass the second carbon bed. The spring applies a small force that resists movement of the flexible diaphragm out of engagement with the outlet tube to bias the bypass valve toward the closed position.

In illustrative embodiments, the vapor flow controller also includes a bleed orifice providing a vapor flow passageway interconnecting the inlet of the modular secondary filter bed housing with the second carbon bed and a one-way check valve that allows flow along a third flow path from the second carbon bed to the inlet of the modular secondary filter bed housing and, eventually, the first carbon bed during purge of the canister. The bleed orifice extends through a wall separating the inlet of the modular secondary filter bed housing from the second carbon bed and conducts fuel vapor from the first carbon bed to the second carbon bed during normal operation. The one-way check valve allows atmospheric air drawn into the canister to pass from the second carbon bed to the inlet of the modular secondary filter bed housing and, eventually, the first carbon bed during purging of the canister when atmospheric air is drawn through the canister system by a vacuum created in the intake manifold while the engine is running to remove hydrocarbons from the first and second carbon beds and discharge them into the engine where they are burned.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a partially diagrammatic view of a vehicle fuel system including a fuel vapor recovery system in accordance with the present disclosure showing that the fuel vapor recovery system includes a primary recovery canister having a first carbon bed and a modular secondary recovery canister having a second carbon bed, showing that the primary recovery canister is coupled to a tank vent control system and to an engine intake manifold, and showing that the modular secondary recovery canister is coupled to the primary recovery canister, the atmosphere, and to a fuel tank filler neck;

FIG. 2 is an exploded perspective view of the modular second recovery canister showing that the modular second recovery canister includes a fuel vapor controller configured to control the flow of fuel vapor from the fuel tank through the modular secondary recovery canister blocking most fuel vapor discharged during refueling from the second carbon bed so that the second carbon bed remains relatively clean and is not saturated with hydrocarbons during refueling and directing all fuel vapor discharged during daily expansion of fuel/fuel vapor into the second carbon bed so that the fuel vapor is stripped of additional hydrocarbons before being discharged to the atmosphere;

FIG. 3 is a detail view of a portion of FIG. 2 showing that the vapor flow controller includes a bypass valve having a flexible diaphragm, a bleed orifice formed in a wall separating the first carbon bed from the second carbon bed, and a one-way check valve provided by a plurality of umbrella valves mounted in the wall separating the first carbon bed from the second carbon bed;

FIG. 4 is a diagrammatic view of an illustrative embodiment of an engine fuel system in accordance with the present disclosure showing fuel vapor vented from the fuel tank to the fuel vapor recovery system to flow along a first path through the first carbon bed in the primary recovery canister and directed by the bypass valve of the vapor flow controller around the second carbon bed in the modular secondary recovery canister before being discharged to the atmosphere during refueling of the fuel tank so that the second carbon bed remains clean during refueling;

FIG. 5 is a diagrammatic view similar to FIG. 4 showing fuel vapor vented from the fuel tank to the fuel vapor recovery system to flow along a second path through the first carbon bed in the primary recovery canister and directed through a bleed orifice included in the vapor flow controller to the second carbon bed in the modular secondary recovery canister before being discharged to the atmosphere during normal operation of the engine fuel system, such as during daily expansion of fuel in the fuel tank caused by warming of the fuel tank, so that the fuel vapor is double filtered by the clean second carbon bed during normal operation venting;

FIG. 6 is a diagrammatic view similar to FIGS. 4 and 5 showing purging of the two separate carbon beds in the fuel vapor recovery system as air is pulled through the second carbon bed and the first carbon bed along a third path by a purge vacuum from the intake manifold when the engine is on (during normal vehicle operation) to cause fuel vapor (laden with hydrocarbons released from both of the first and second carbon beds) to move thorough a purge port into the intake manifold for combustion in the engine;

FIG. 7 is a partially diagrammatic view of the vehicle fuel system in FIG. 1 with the modular secondary recovery canister cut away to show fuel vapor vented from the fuel tank to the fuel vapor recovery system flowing through the first carbon bed in the primary recovery canister bypassing the second carbon bed in the modular secondary recovery canister and being discharged to the atmosphere during refueling of the fuel tank so that the second carbon bed remains clean during refueling;

FIG. 7A is a detail view of a portion of FIG. 7 showing the vapor flow controller with the bypass valve opened in response to being exposed to atmospheric pressure on one side and fuel tank pressure on the other to allow fuel vapor to flow from the first carbon bed directly to atmosphere without flowing through the second carbon bed;

FIG. 8 is a view similar to FIG. 7 showing fuel vapor vented from the fuel tank to the fuel vapor recovery system flowing through the first carbon bed in the primary recovery canister and the second carbon bed in the modular secondary recovery canister before being discharged to the atmosphere during normal operation of the engine fuel system so that the fuel vapor is double filtered by the clean second carbon bed during normal operation;

FIG. 8A is a detail view of a portion of FIG. 8 showing the vapor flow controller with the bypass valve closed to block fuel vapor from flowing from the first carbon bed directly to atmosphere and forcing all fuel vapor through the bleed orifice included in the vapor flow controller and through the second carbon bed before being discharged to atmosphere;

FIG. 9 is a view similar to FIGS. 7 and 8 showing purging of the two separate carbon beds in the fuel vapor recovery system as air is pulled from atmosphere through the second carbon bed and the first carbon bed toward the intake manifold when the engine is on (during normal vehicle operation) to cause fuel vapor (laden with hydrocarbons released from both of the first and second carbon beds) to move thorough a purge port into the intake manifold for combustion in the engine;

DETAILED DESCRIPTION

Figure 1:
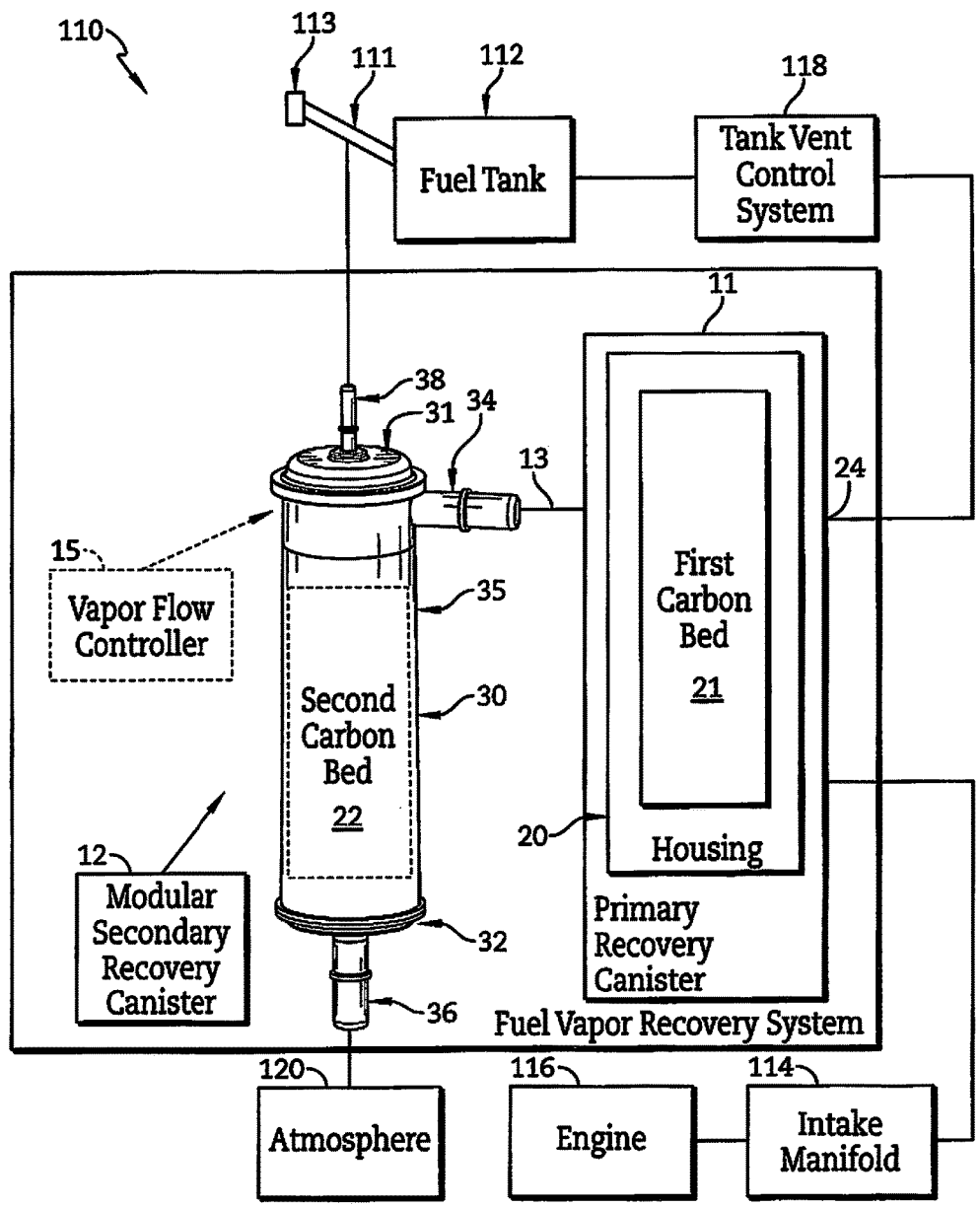

A fuel vapor recovery canister system 10 adapted for use in a corresponding vehicle fuel system 110 to capture and retain hydrocarbons discharged from a fuel tank 112 of the fuel system 110 is shown in FIG. 1. Canister system 10 includes a primary recovery canister 11 with a first carbon bed 21 and a modular secondary recovery canister 12 with a second carbon bed 22 that is optionally coupled to the primary recovery canister 11. Modular secondary recovery canister 12 is adapted to capture and store hydrocarbons entrained in fuel vapor that are discharged from the primary recovery canister 11 during daily expansion of fuel/fuel vapor in fuel tank 112 caused by heating of fuel tank 112 during the warm temperatures of the day.

A vapor flow controller 15 included in modular secondary recovery canister 12 is configured to control the movement of fuel vapor through modular secondary recovery canister 12 as shown in FIGS. 4-6 and 7-9A. Specifically, vapor flow controller 15 directs fuel vapor to interact with second carbon bed 22 during daily expansion of fuel/fuel vapor in a fuel tank 112 while directing a most fuel vapor to bypass second carbon bed 22 during refueling of fuel tank 112. By bypassing second carbon bed 22 during refueling, second carbon bed 22 is kept substantially clean for use capturing hydrocarbons discharged during daily expansion of fuel in fuel tank 112 as suggested in FIGS. 4 and 6.

Canister system 10 is included in vehicle fuel system 110 associated with a vehicle having an intake manifold 114 communicating with canister system 10 and an engine 116 coupled to intake manifold 114 as suggested in FIG. 1. Canister system 10 is configured to clean fuel vapor vented from fuel tank 112 during tank refueling as suggested in FIGS. 4 and 7. Canister system 10 is further configured to clean fuel vapor vented from fuel tank 112 during daily (diurnal) expansion of fuel/fuel vapor caused by heating of the fuel tank during the day as suggested in FIGS. 5 and 8. Canister system 10 is cleaned or purged using a vacuum provided by intake manifold 114 when engine 116 is running as suggested in FIGS. 6 and 9.

A tank vent control system 118 is configured to conduct fuel vapor discharged from fuel tank 112 into canister system 10 as suggested in FIGS. 4, 5, 7, and 8. It is within the scope of this disclosure to use any suitable system of conduits and valves to produce a system to conduct fuel vapor from fuel tank 112 to canister system 10 to be cleaned as the fuel vapor passes through first and/or second carbon beds 21, 22 included in canister system 10, and filtered air is discharged from canister system 10 to the atmosphere 120.

In use, hydrocarbon material (not shown) entrained in fuel vapor discharged from fuel tank 112 into canister system 10 passed through first carbon bed 21 and sometimes second carbon bed 22 is captured or stored (e.g., adsorbed) on charcoal granules included in carbon beds 21, 22. Therefore, hydrocarbon material is removed from fuel vapor as that fuel vapor passes through first and second carbon beds 21, 22 and a stream of single or double cleaned vapor is discharged from canister system 10 to atmosphere 120 during a vapor-cleaning process that can occur during tank-refueling activities and during daily expansion of fuel/fuel vapor.

Primary recovery canister 11 includes first carbon bed 21 contained in a primary filter bed housing 20 as shown in FIG. 1. Primary filter bed housing 20 includes a carbon carrier 25, a fuel vapor port 24, a vacuum port 26, and an outlet port 28. Carbon carrier 25 is configured to house first carbon bed 21. Fuel vapor port 24 opens into carbon carrier 25 and is fluidly coupled to fuel tank 112 through tank vent control system 118 to provide an inlet for fuel vapor into first carbon bed 21. Vacuum port 26 opens into carbon carrier 25 and fluidly couples engine 116 through intake manifold 114 to first carbon bed 21. Outlet port 28 opens into carbon carrier 25 and is fluidly coupled to modular secondary recovery canister 12 to discharge vapor passing through first carbon bed 21 from fuel vapor port 24 out to modular secondary recovery canister 12. In the illustrative embodiment, the fluid coupling of each port 24, 26, 28 included in primary recovery canister 11 are adapted to be coupled to conduit that extends from primary recovery canister 11 but may be configured for use with other suitable couplings.

Figure 2:
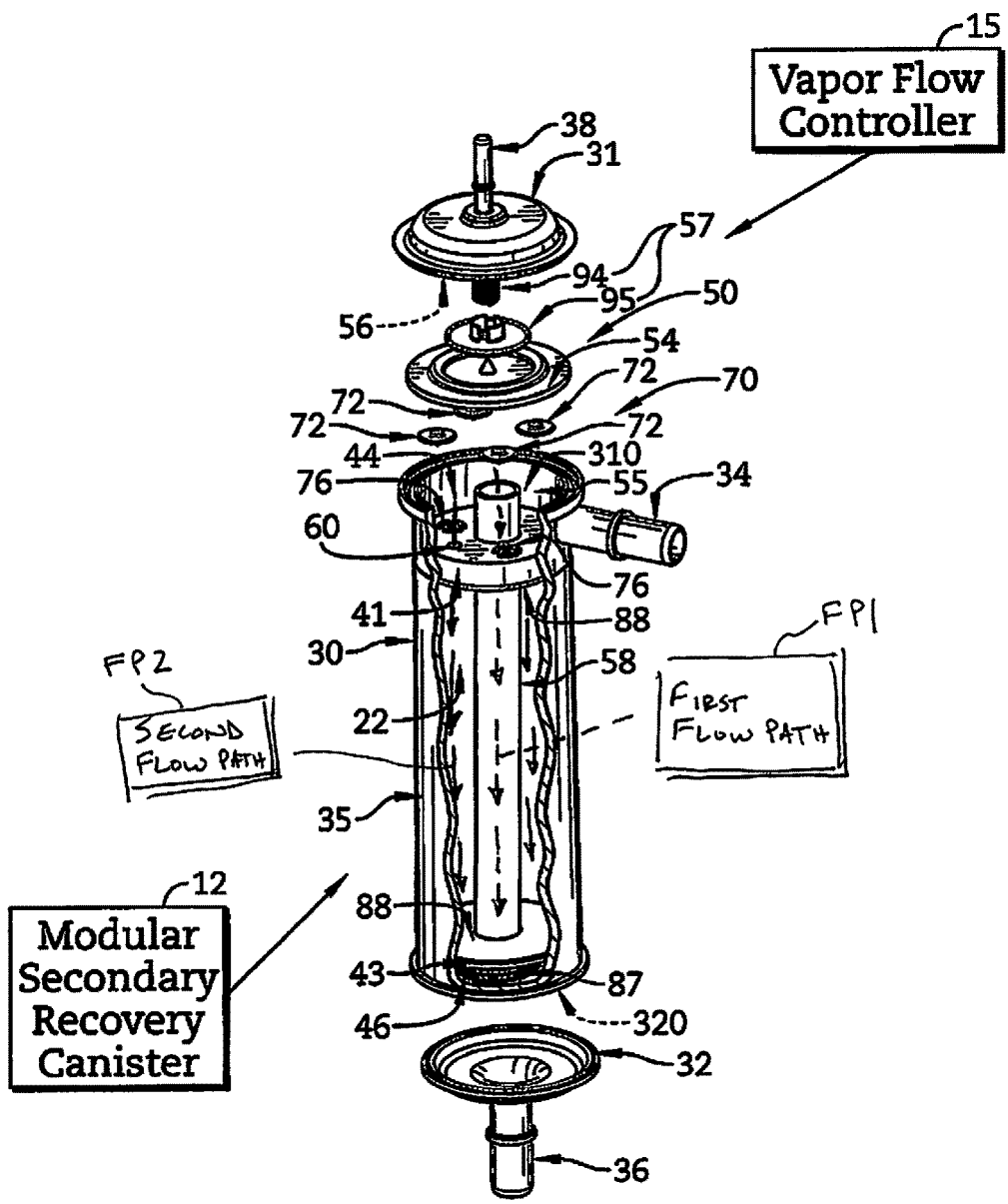

Modular secondary recovery canister 12 is independent of primary recovery canister 11 and is configured to be optionally coupled to primary recovery canister 11 by a conduit 13 as shown in FIG. 1. Modular secondary recovery canister 12 includes second carbon bed 22 contained in a secondary filter bed housing 30 as shown in FIGS. 1 and 2. Secondary filter bed housing 30 of the illustrative embodiment includes a receiver 35, a first cover 31, and a second cover 32 as shown in FIG. 2. Receiver 35 provides an internal cavity 40 divided by a walls 41, 43 into a carbon-receiving space 42 that receives second carbon bed 22, a valve-receiving space 44 that receives components of vapor flow controller 15, and atmosphere-interfacing space 46 as shown in FIG. 2. First cover 31 is coupled to receiver 35 to close a corresponding opening 310 and enclose valve-receiving space 44. Second cover 32 is coupled to receiver 35 to close a corresponding opening 320 and enclose atmosphere-interface space 46.

Secondary filter bed housing 30 is illustratively spaced apart from separate from primary recovery canister 20 such that secondary filter bed housing 30 as shown, for example, in FIG. 1. Secondary filter bed housing 30 includes an inlet port 34, an atmospheric port 36, and a valve-control port 38 as shown in FIG. 2. Inlet port 34 opens into valve-receiving space 44 of receiver 35 and is fluidly coupled to outlet port 28 of primary recovery canister 20. Atmospheric port 36 opens into atmosphere-interfacing space 46 and is fluidly coupled to atmosphere 120. Valve-control port 38 opens into valve-receiving space 44 and is fluidly coupled to a fuel filler neck 111 included in fuel tank 110 such that valve-control port 45 is open to atmosphere 120 when a fuel tank closure 113 is opened by a user (illustratively by removing a fuel cap or inserting a nozzle into a capless closure). In the illustrative embodiment, the fluid coupling of each port 34, 36, 38 included in modular secondary recovery canister 12 are adapted to be coupled to conduit that extends from modular secondary recovery canister 12 but may be configured for use with other suitable couplings.

Second carbon bed 22 comprises a second group of carbon granules as suggested in FIG. 2. In the illustrative embodiment, walls 41, 43, a spring 87, and vapor-permeable pads 88 are used to pack the carbon granules of the second carbon bed 22. It is within the scope of this disclosure to provide any suitable means for retaining the carbon granules in a packed arrangement.

Figure 3:
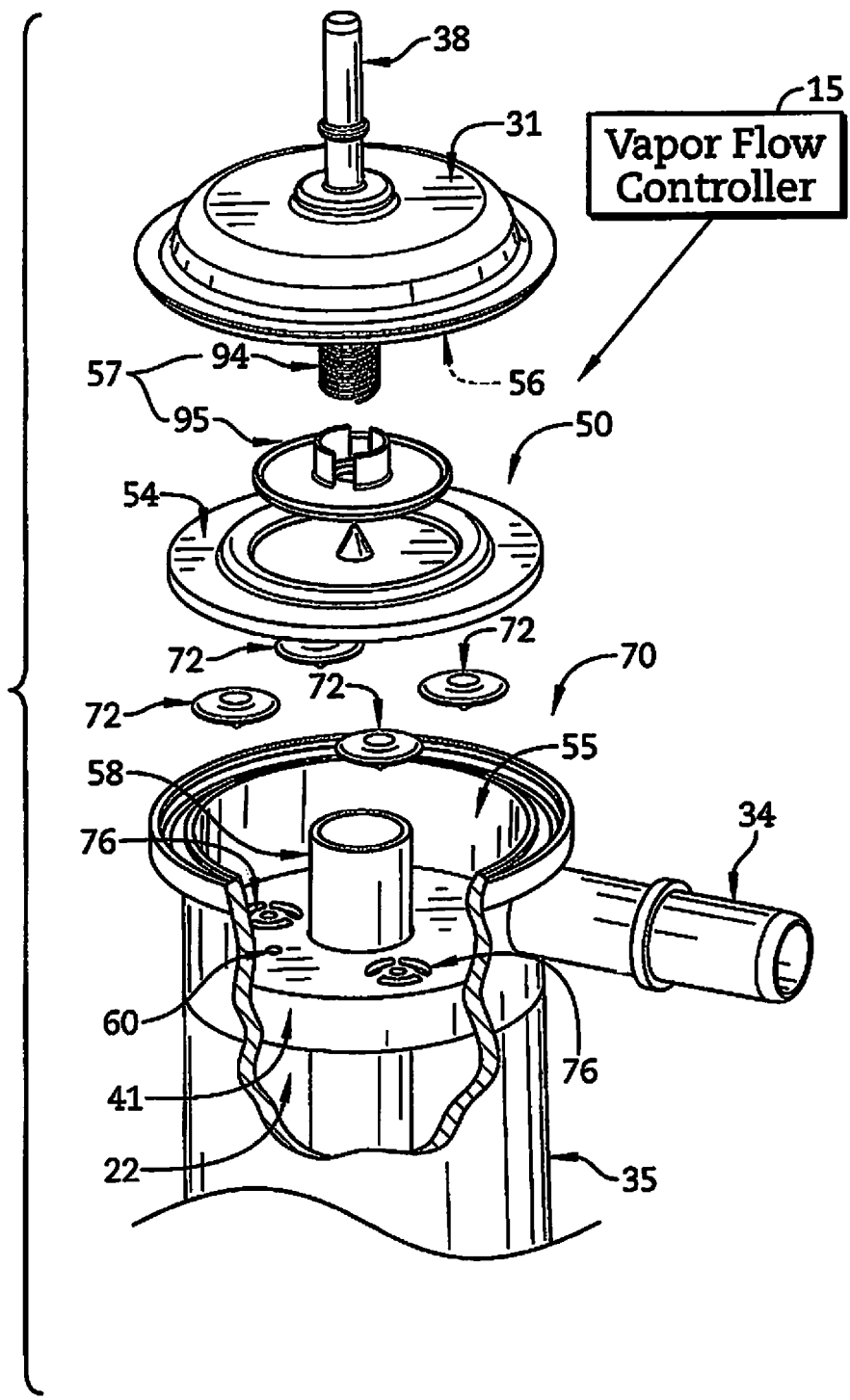
Figure 4:
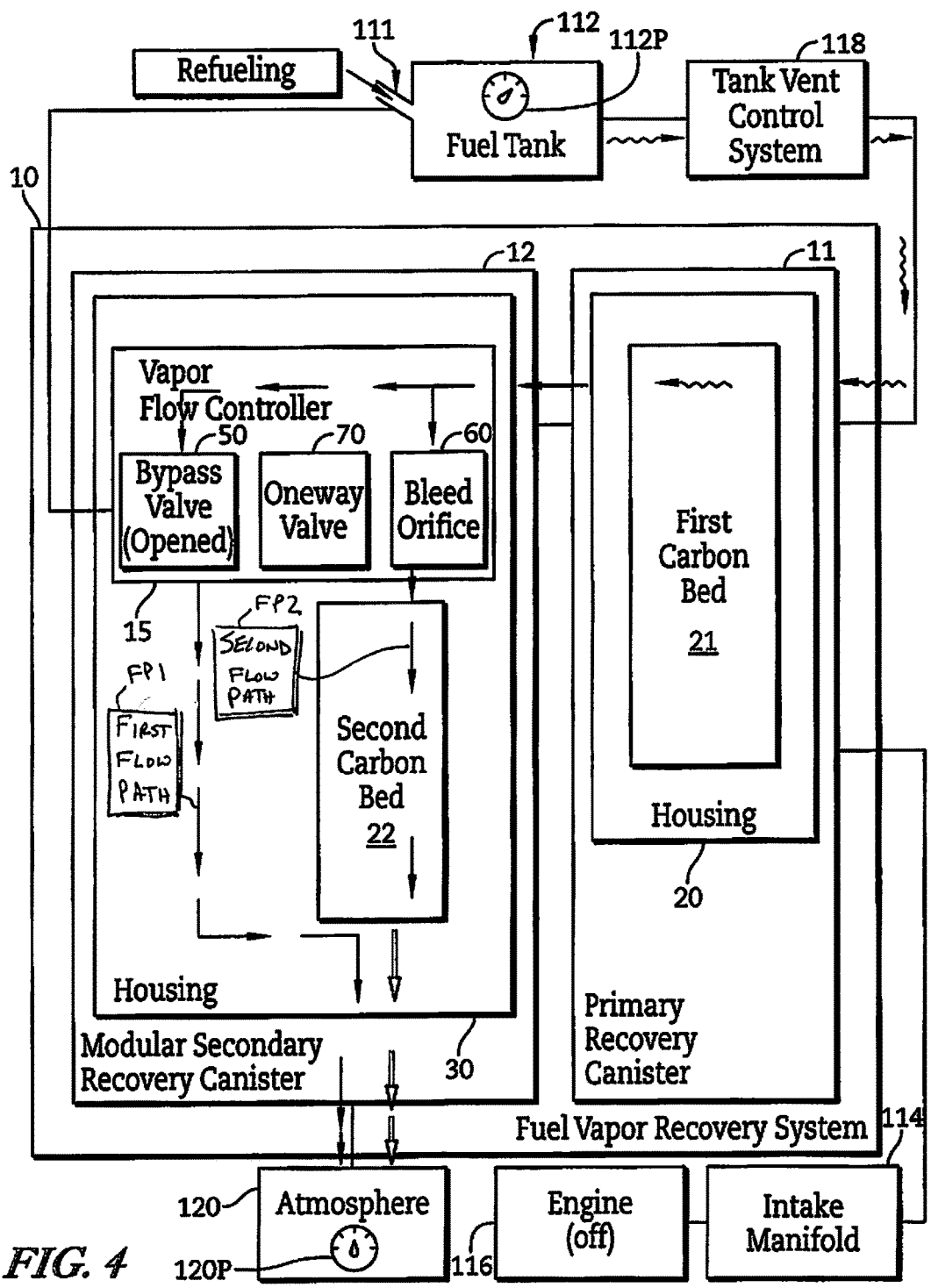
Figure 5:
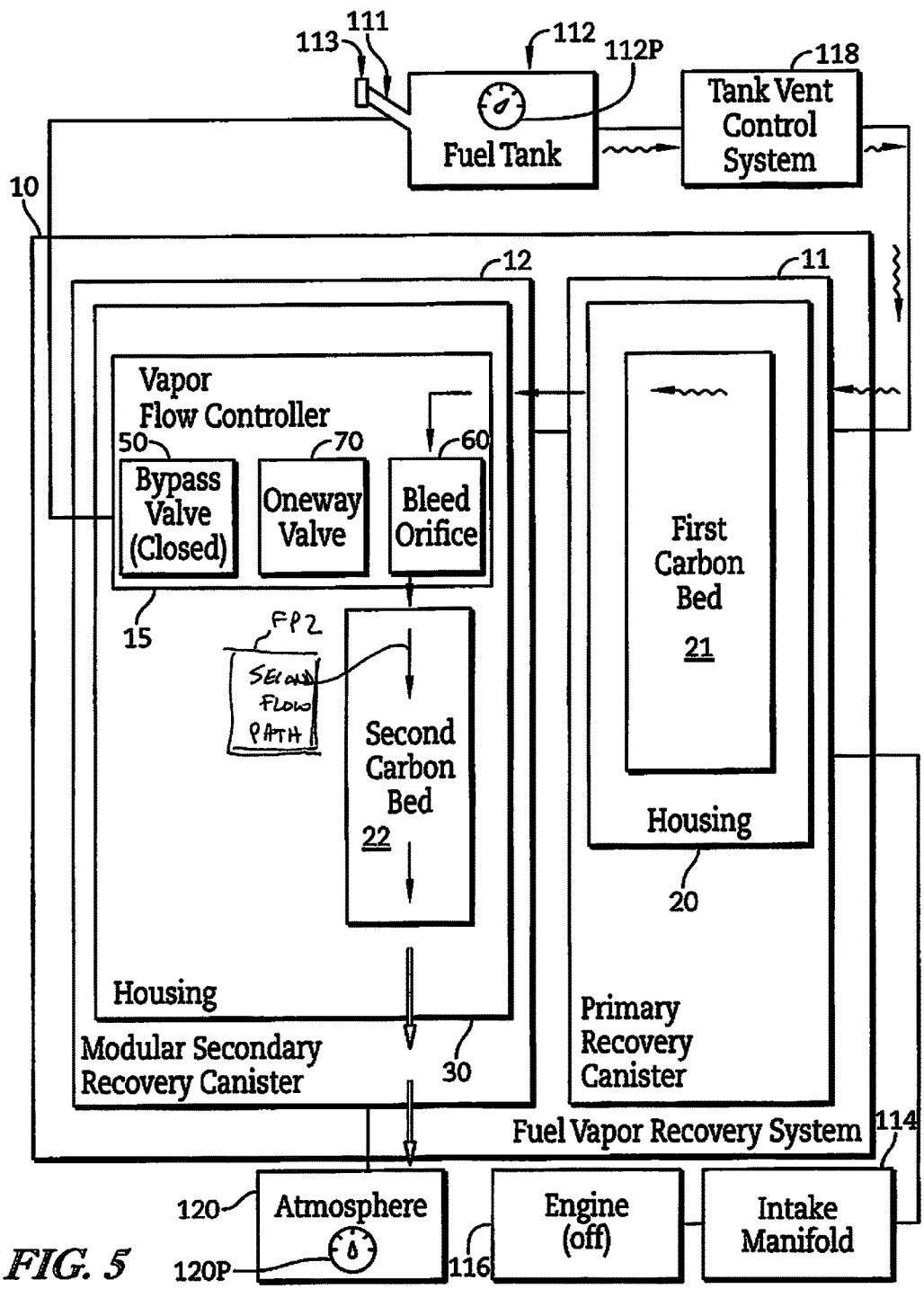

Vapor flow controller 15 illustratively includes a bypass valve 50, a bleed orifice 60, and a one-way check valve 70 that cooperate to control the movement of fuel vapor through the canister 10 as shown illustratively in FIG. 3 and diagrammatically in FIG. 4. Bypass valve 50 is illustratively configured to be opened when fuel tank closure 113 is opened during tank refueling so that most of the fuel vapor vented from fuel tank 112 moves through first carbon bed 21 in primary recovery canister 11 but not through second carbon bed 22 in modular secondary recovery canister 12 along a first flow path FP1. Accordingly, second carbon bed 22 remains relatively clean to store hydrocarbons from fuel vapor vented during daily (diurnal) expansion of fuel/fuel vapor as suggested in FIGS. 4 and 7. Bleed orifice 60 is sized to allow pressurized fuel vapor vented from fuel tank 24 to move from first carbon bed 21 to second carbon bed 22 along a second flow path FP2 when bypass valve 40 is closed so that vapor discharged during daily (diurnal) expansion of fuel/fuel vapor is filtered by both first and second carbon beds 21, 22 as suggested in FIGS. 5 and 8. Because bleed orifice 60 is always open, some nominal amount of flow through orifice 60 between the first and second carbon beds 21, 22 occurs during refueling and during purging. One-way check valve 70 allows flow from second carbon bed 22 in modular secondary recovery canister 12 to first carbon bed 21 in primary recovery canister 11 along a third flow path FP3 during purging when vacuum provided by intake manifold 114 pulls atmospheric air through canister system 10 as suggested in FIGS. 6 and 9.

Bypass valve 50 is illustratively a pressure-controlled valve housed in receiver 35 of modular secondary recovery canister 12 as shown in FIG. 3. Bypass valve 50 of the illustrative embodiment includes a flexible diaphragm 54 that divides valve-receiving space 44 of secondary filter bed housing 30 into a lower portion 55 and an upper portion 56, an outlet tube 58 that extends from valve-receiving space 44 to atmosphere-interface space 46, and a bias assembly 57 that biases the flexible diaphragm as shown in FIGS. 2 and 3. Flexible diaphragm 54 moves within valve volume 53 to block or allow a relatively large flow of fuel vapor from moving through valve volume 53 into outlet tube bypassing second carbon bed 22. Outlet tube 58 extends coaxially through second carbon bed 22 and is selectively opened to or closed off from internal valve volume 53 by flexible diaphragm 54. Bias assembly 57 includes a spring 94 and a spring plate 95 configured to bias flexible diaphragm 54 toward engagement with outlet tube 58 blocking fuel vapor from bypassing second carbon bed 22.

Figure 7:
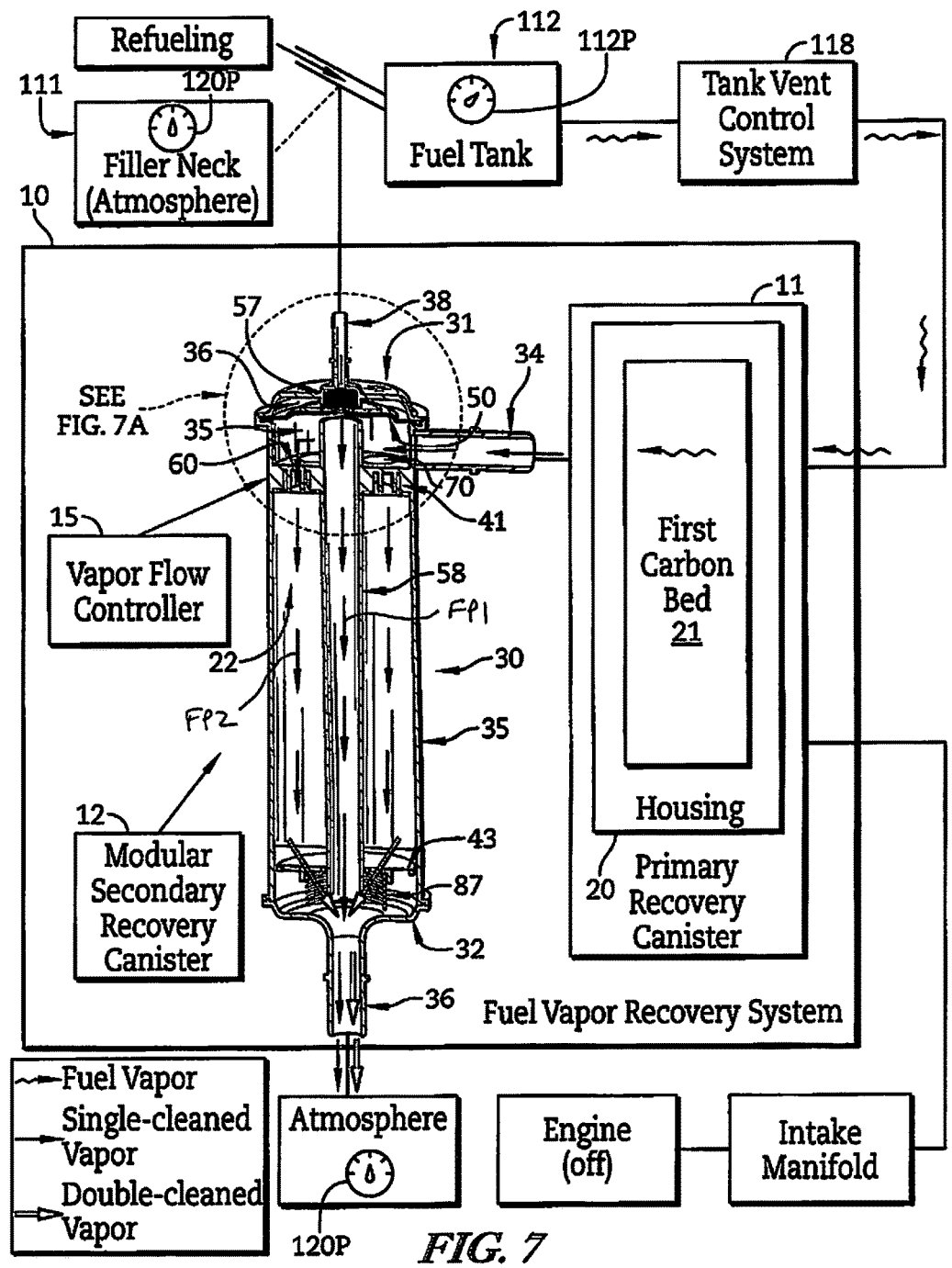
Figure 7A:
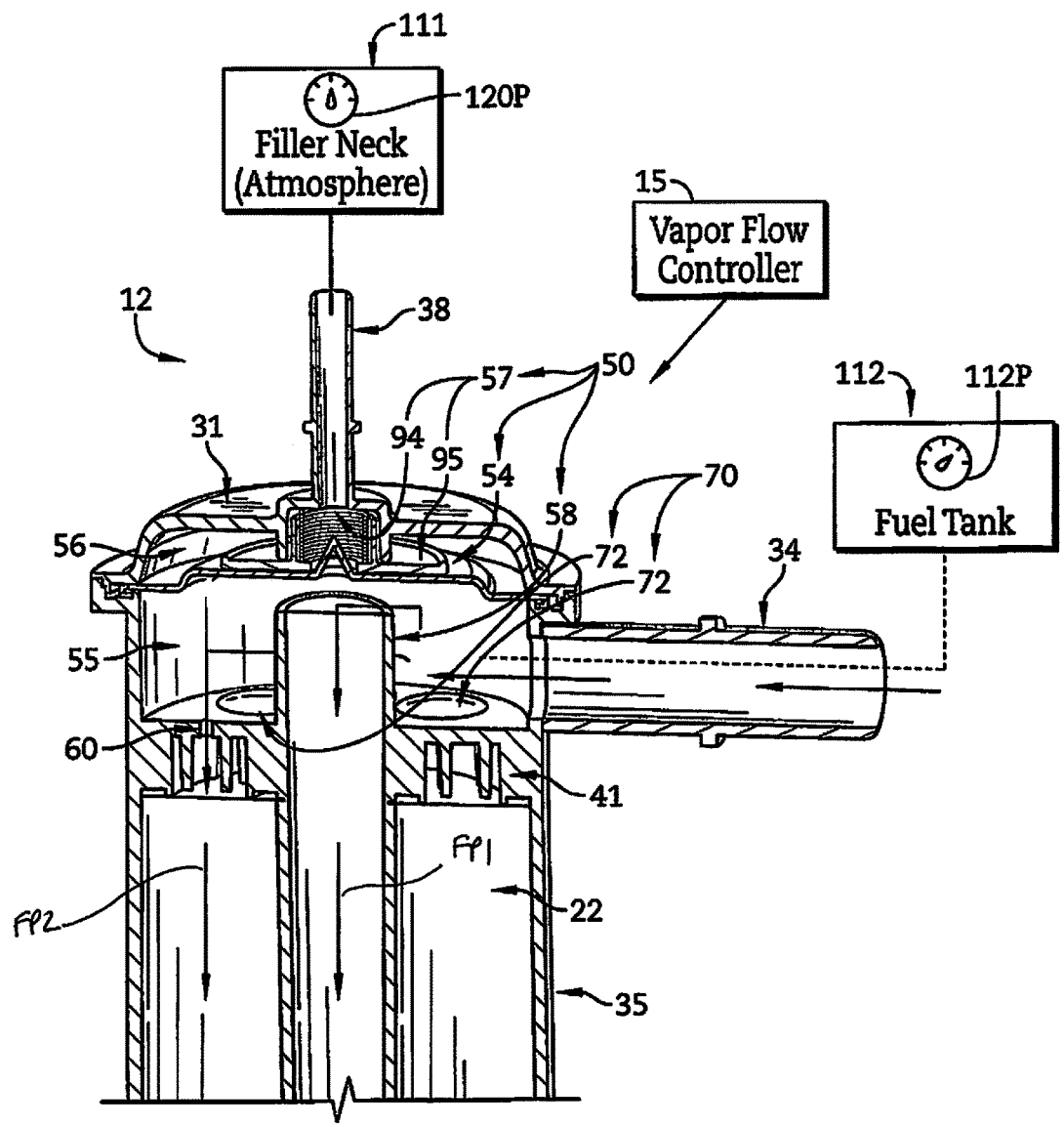
Figure 8:
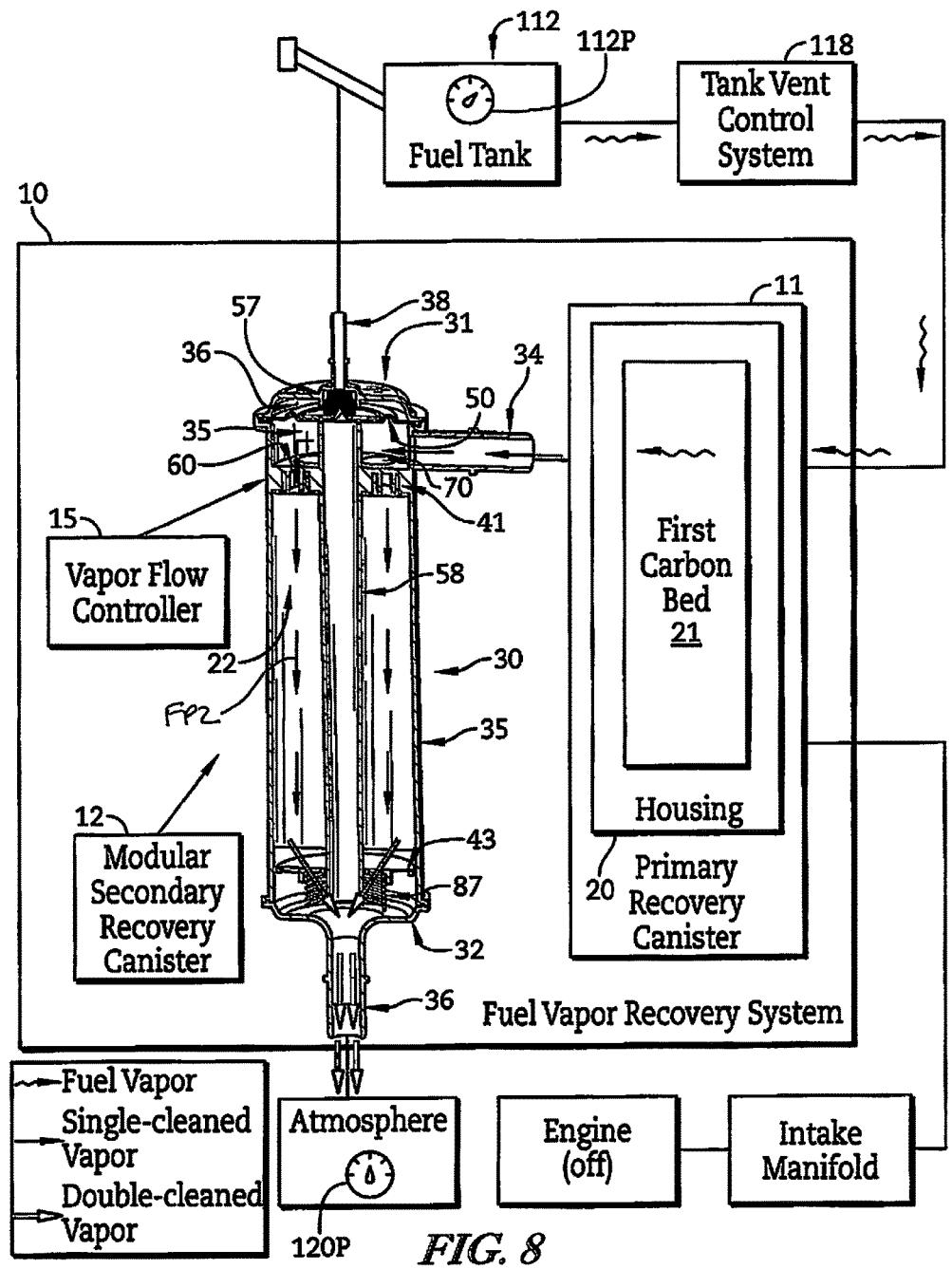
Figure 8A:
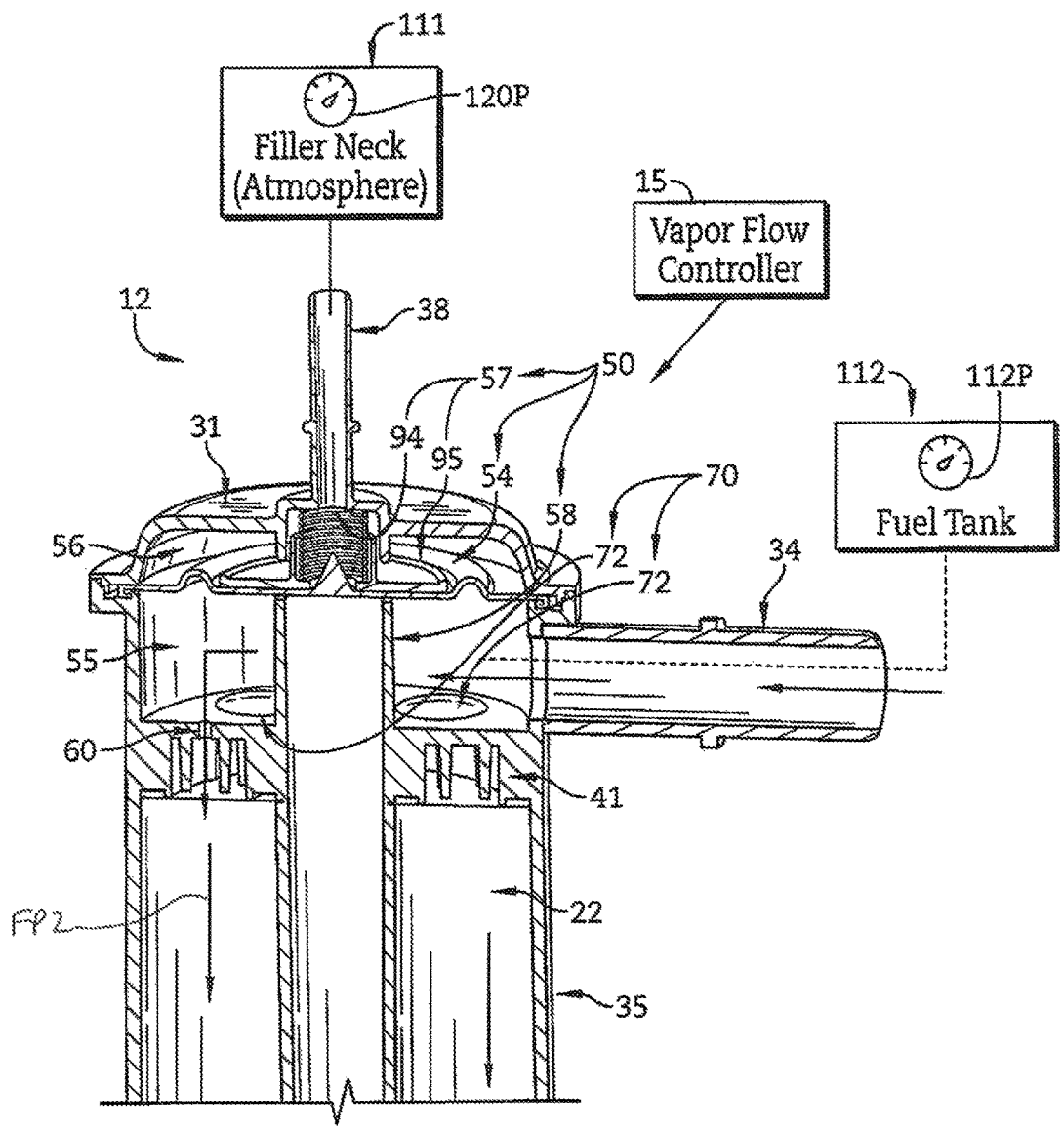

Valve-control port 38 provides fluid communication between upper portion 56 of valve-receiving space 44 and filler neck 111 so that upper portion 56 of valve-receiving space 44 is open to atmosphere 19 when fuel tank closure 113 is opened as suggested in FIGS. 4 and 7. Flexible diaphragm 54 is biased toward a first position closing off outlet tube 58 from valve-receiving space 44 but may be moved to a second position opening up outlet tube 58 when valve-control port 38 is open to atmosphere 120 and pressure in fuel tank 112 is greater than atmosphere 120, such as is typical during refueling.

Bypass valve 50 moves from being normally closed to open when (1) fuel tank closure 46 is opened by a user removing a fuel cap and (2) pressure in fuel tank 112 is pressure in the atmosphere 120 as shown in FIGS. 4 and 7. A first side 54A of flexible diaphragm 54 is exposed to pressure from fuel tank 112 and normally engages outlet tube 58 to block fuel vapor from moving into outlet tube 58 and bypassing second carbon bed 22. A second side 54B of the flexible diaphragm, opposite the first side 54B, is exposed to pressure from fuel tank 112 when fuel tank closure 113 is closed and is exposed to pressure from atmosphere 120 when the fuel tank closure 113 is opened by a user removing a fuel cap. When fuel tank 112 pressure is greater than atmospheric pressure and the fuel tank closure is opened, as is typical during refueling, flexible diaphragm 54 bends out of engagement with outlet tube 58 to allow fuel vapor to move into outlet tube 58 and bypassing second carbon bed 22.

During refueling, bypass valve 50 is moved to an opened position in response to opening of fuel tank closure 113 and while pressure in fuel tank 112 is greater than atmospheric pressure as suggested by fuel tank pressure 24P in FIGS. 4 and 7. Particularly, when fuel tank closure 113 is opened, upper portion 56 of valve-receiving space 44 is exposed to atmospheric pressure via valve-control port 38. Further, lower portion 55 of valve-receiving space 44 is exposed to greater than atmospheric pressure from fuel tank 112. The pressure difference between upper portion 56 and lower portion 55 of valve-receiving space 44 causes flexible diaphragm 54 to bend toward upper portion 56 and the second position at which time outlet tube 58 is open to conduct fuel vapor from primary recovery canister 11 moving through inlet port 34 directly to atmosphere 120 as shown in FIGS. 4 and 7.

Bleed orifice 60 is illustratively formed in wall 41 of receiver 35 included in secondary filter bed housing 30 and provides fluid communication between lower portion 55 of valve-receiving space 44 and second carbon bed 22 as shown in FIG. 3. During normal operation of fuel system 12, when fuel tank closure 113 is closed, bypass valve 50 is closed and fuel vapor exiting fuel tank 24 moves from valve-receiving space 44 through bleed orifice 60 into second carbon bed 22 and then to atmosphere 19 along the second flow path FP2. Accordingly, vapor discharged during normal operation is double cleaned in both first and second carbon beds 21, 22 and carries very few (if any) hydrocarbons into the atmosphere.

Figure 6:
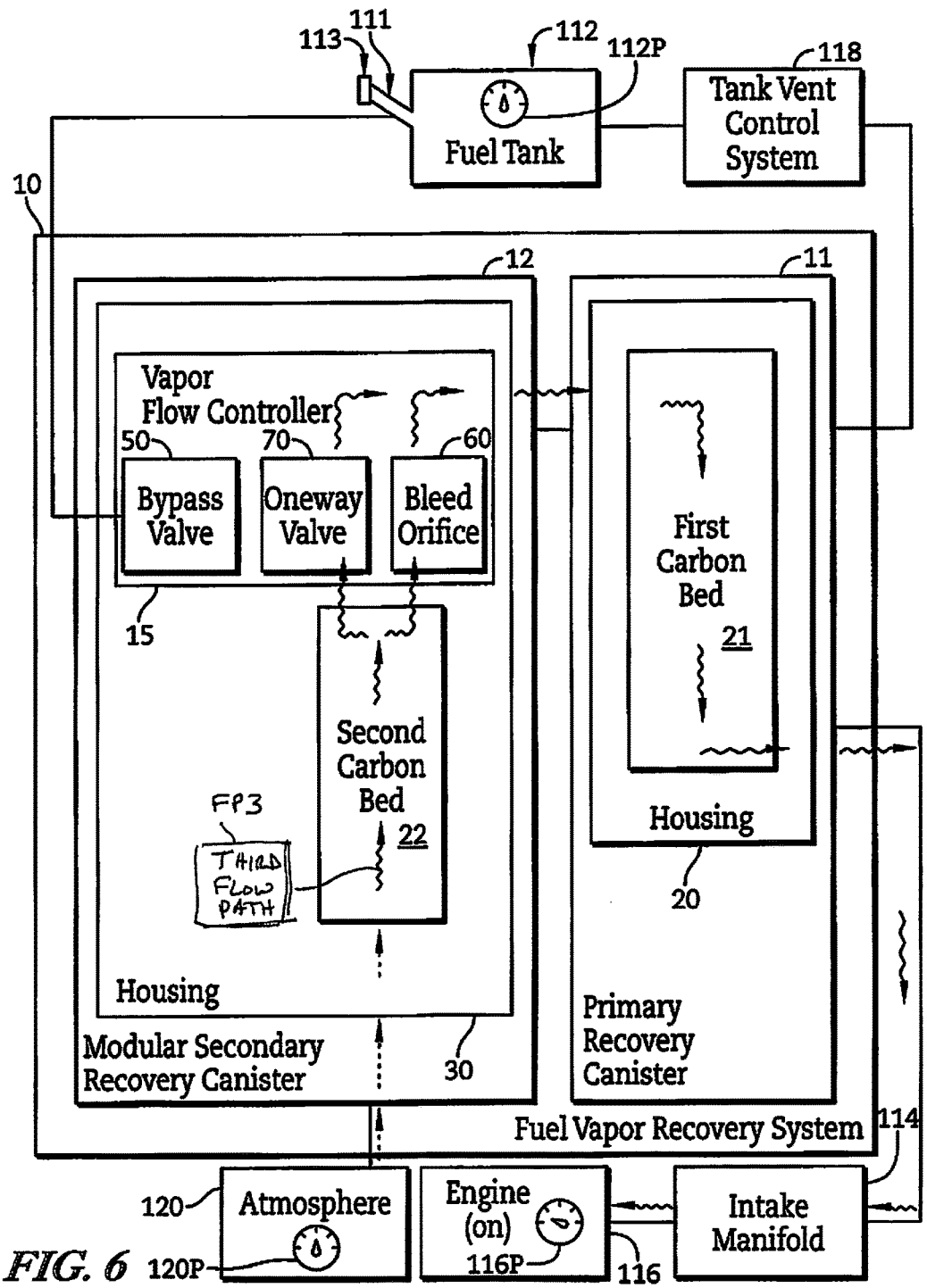
Figure 9:
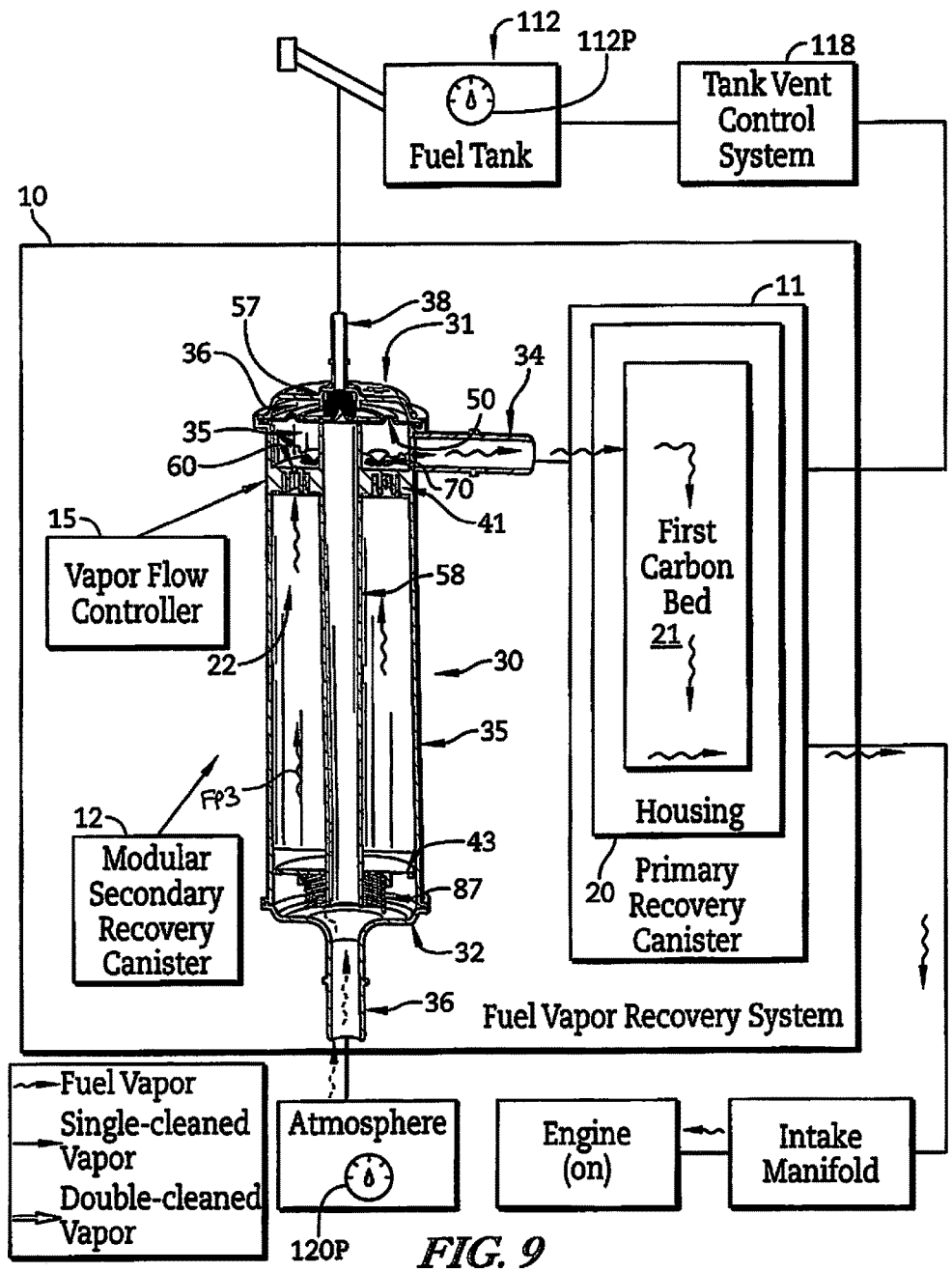
FIG. 9A is a detail view of a portion of FIG. 8 showing the air flowing through the bleed orifice and through opened one-way check valves allowing the air to move from the second carbon bed toward the first carbon bed to pick up hydrocarbons from both of the carbon beds for subsequent release into the intake manifold for combustion in the engine.
Figure 9A:
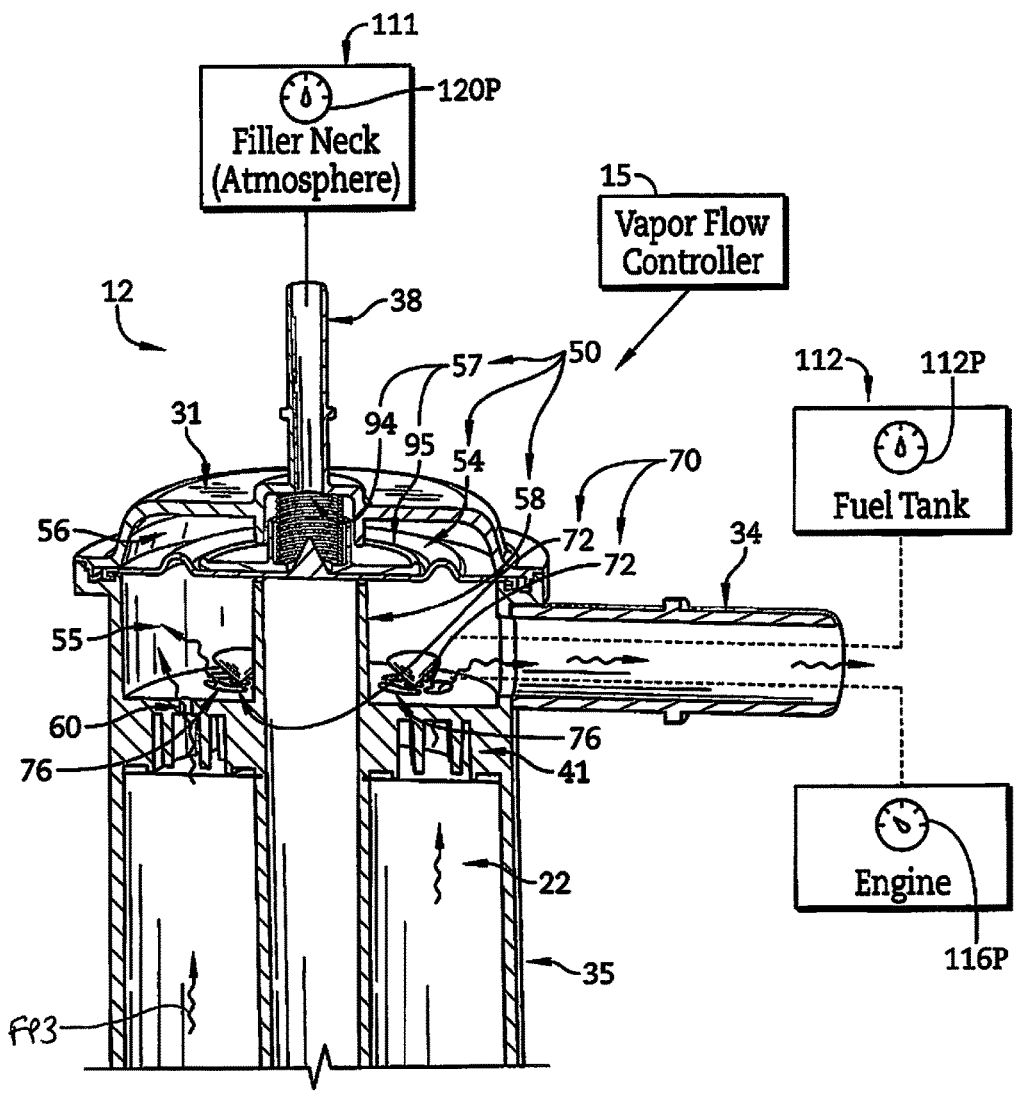

One-way check valve 70 is adapted to allow atmospheric air and fuel vapor to be pulled through second carbon bed 22 of modular secondary recovery canister 12 and first carbon bed 21 of primary recovery canister 11 into intake manifold 114 and engine 116 along the third flow path FP3 during purging of canister system 10 as suggested in FIGS. 6 and 9. In the illustrative embodiment, one-way check valve 70 illustratively includes umbrella valves 72 as shown in FIG. 3. Each umbrella valve 72 is adapted to block or allow flow through purge holes 76 formed in wall 41 of receiver 35 included in secondary filter bed housing 30. Particularly, during purging, atmospheric air and fuel vapor being pulled through second carbon bed 22 from atmosphere 120 by vacuum pressure 116P from running engine 116 acts upon umbrella valves 72 through purge holes 76 causing umbrella valves 72 to flex away from wall 41 and allow flow through purge holes 76 as suggested in FIGS. 9 and 9A.

In illustrative embodiments, the vapor flow controller 15 in the canister system 10 controls the path of the fuel vapors moving through the canister system 10. During refueling, the diaphragm 54 of the bypass valve 50 is open with the fuel cap off such that the fuel tank closure 113 is opened. This allows the fuel vapor during refueling to go through the first carbon bed 21 and exit the canister system 10 without loading the second (last) carbon bed 22.

In illustrative embodiments, when the fuel cap is on and the fuel tank closure 46 is closed, the bypass valve 50 is in the closed position and allows the purge to pull the fresh air into the canister 10 cleaning the second carbon bed 22 and going to the first carbon bed 21 to be clean through the umbrella valves 72.

In illustrative embodiments, when the bypass valve 50 is closed and the purge is not running, the second carbon bed 22 is closed and only small amount of vapor will enter the second carbon bed 22 which is very clean and will lower the amount exiting the canister system 10 during the daily (diurnal) heating of the fuel in the fuel tank 112 which leads to expansion and venting of fuel vapor.

In illustrative embodiments, the vapor flow controller 17 enables two engine-off operational modes for the canister system 10. In the first, refueling mode, the second carbon bed 22 is isolated from all refueling loading. In the second, normal-operation mode, all fuel vapor is directed through both the first carbon bed 21 and the second carbon bed 22. The second carbon bed 22 is always purged during engine operation to prepare for the next fuel vent event.

Exemplary tests of illustrative canister systems were performed as described below. The exemplary test show performance of specific embodiments of the present disclosure but are not limiting and various other configurations are contemplated herein.

A canister bleed emission standard test was used to measure the performance of the following exemplary canisters. The standard test included a conditioning phase and a performance test phase.

The conditioning phase included the steps of:
1. Fuel is flowed at 10 gallons/minute until a 2 gram breakthrough is reached.
2. The Fuel Vapor Canister is purged with 300 bed volumes (BV) of air.
3. Steps 1-2 are repeated for a total of 10 cycles.
4. 1:1 Butane:$N_2$ is flowed at 50 grams/hour until a 2 gram breakthrough is reached.
5. The Fuel Vapor Canister is purged with 150 BV of air.

After the conditioning phase, the performance test phase begins when the conditioned fuel vapor canister is attached to a fuel tank filled to 40% capacity with IE-10 fuel. The fuel tank and the fuel vapor canister are placed in a Sealed Housing for Evaporative Determination (SHED) chamber. The fresh air exit of the Fuel Vapor Canister is attached to a sensor to continuously measure the amount hydrocarbon emitted to the SHED chamber. The fuel tank and Fuel Vapor Canister are equilibrated in the SHED chamber for 12 hours at 65° F. The SHED chamber is cycled from 65° F. to 105° F. over 12 hours, then cooled from 105° F. to 65° F. over 12 hours. This cycle is repeated for a second 24 hours.

EXAMPLE 1

Figure 10:
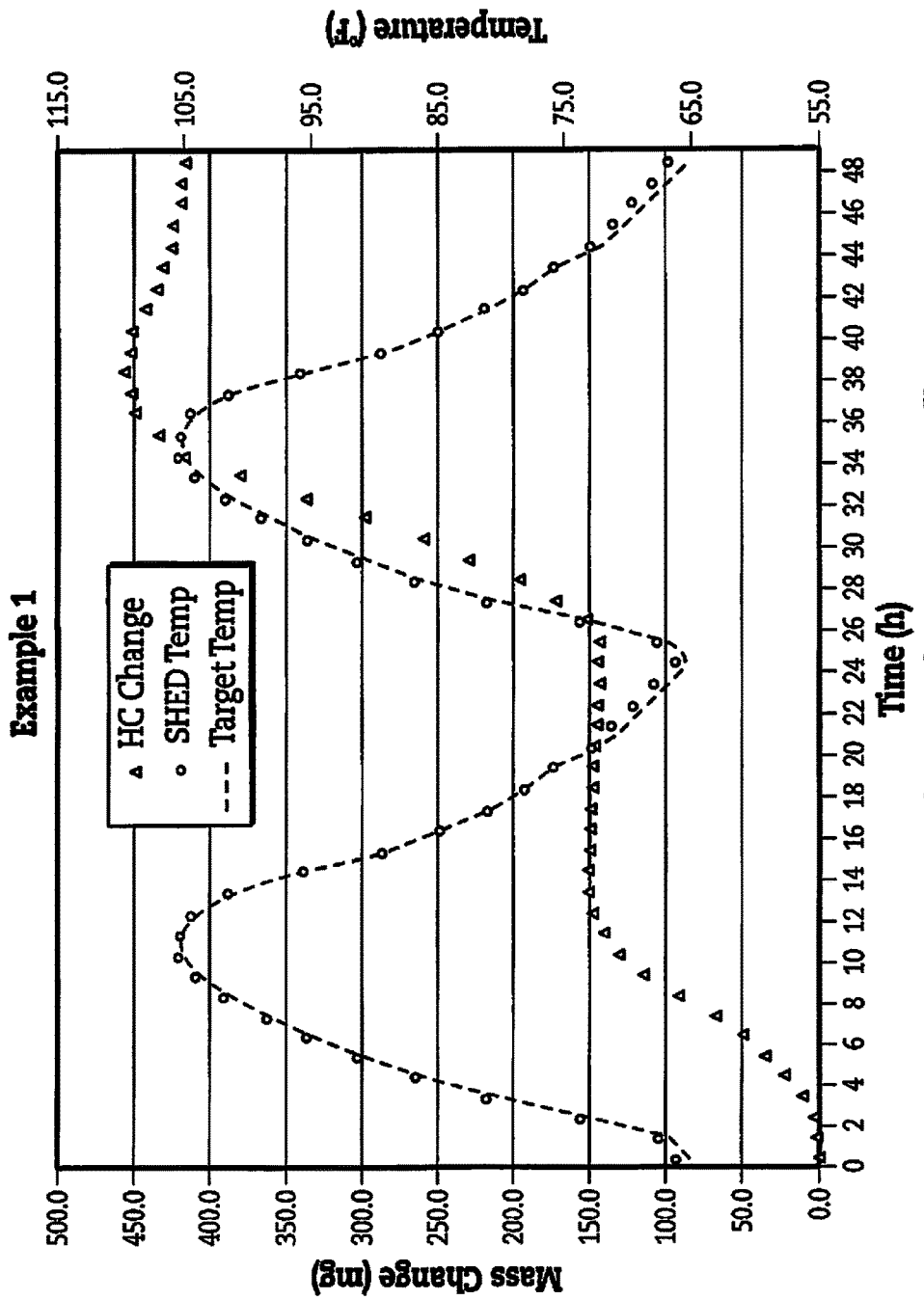
FIG. 10 is a chart showing the amount of hydrocarbon detected in a first exemplary test of a canister system having only a primary recovery canister without a modular secondary recovery canister.

Diurnal Bleed Test Results—Canister System Having Only a Primary Recovery Canister Example 1 tested the hydrocarbon capture performance of a canister system having only a primary recovery canister (2.1 L of carbon) without a modular secondary recovery canister was evaluated as described above. The gained mass of the primary recovery canister is shown in Table 1. The amount of hydrocarbon detected by the SHED can be seen in FIG. 10 and Table 4.

TABLE 1

Primary recovery canister (2.1 L of carbon) without modular secondary recovery canister of Example 1 mass change. The mass of the primary recovery canister was measured during the process described above. The change in mass from the initial weight was calculated.

|  | CUSW Weight gain from initial weight (g) |
| --- | --- |
| After butane: $N_2$ load | 98.28 |
| After 150 BV purge | 20.36 |
| After 12 h equilibration | 23.59 |

EXAMPLE 2

Diurnal Bleed Test Results—Canister System Having a Primary Recovery Canister and a Modified Modular Secondary Recovery Canister (No One-Way Valve)

Figure 11:
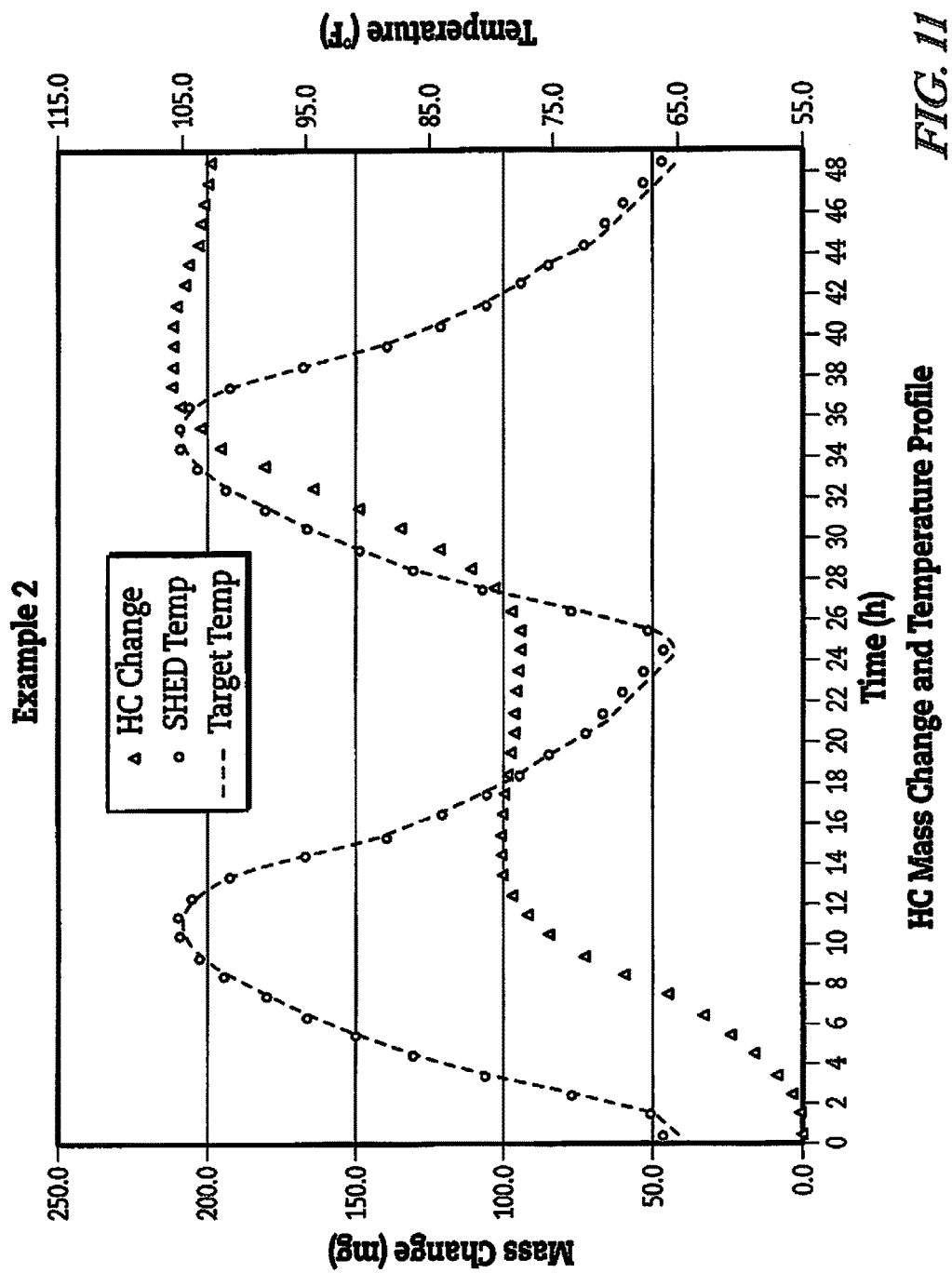
FIG. 11 is a chart showing the amount of hydrocarbon detected in a second exemplary test of a canister system having a primary recovery canister and a modular secondary recovery canister without umbrella valves.

Example 2 tested the hydrocarbon capture performance of a canister system having a primary recovery canister (2.1 L of carbon) and a modular secondary recovery canister modified without umbrella valves (0.375 L of low bleed carbon). The hydrocarbon capture performance was evaluated as described above. The gained mass of the primary recovery canister and the modular secondary recovery canister is shown in Table 2. The amount of hydrocarbon detected by the SHED can be seen in FIG. 11 and Table 4.

TABLE 2

Primary recovery canister (2.1 L of carbon) with modular secondary recovery canister (0.375 L) modified without one-way valves (illustratively umbrella valves) mass change. The mass of the canisters was measured during the process described above. The change in mass from the initial weights were calculated.

|  | CUSW Weight gain from initial weight (g) | CFCV Weight gain from initial weight (g) |
| --- | --- | --- |
| After butane: $N_2$ load | 103.20 | 13.57 |
| After 150 BV purge | 24.33 | 0.12 |
| After 12 h equilibration | 23.80 | 1.60 |

EXAMPLE 3

Figure 12:
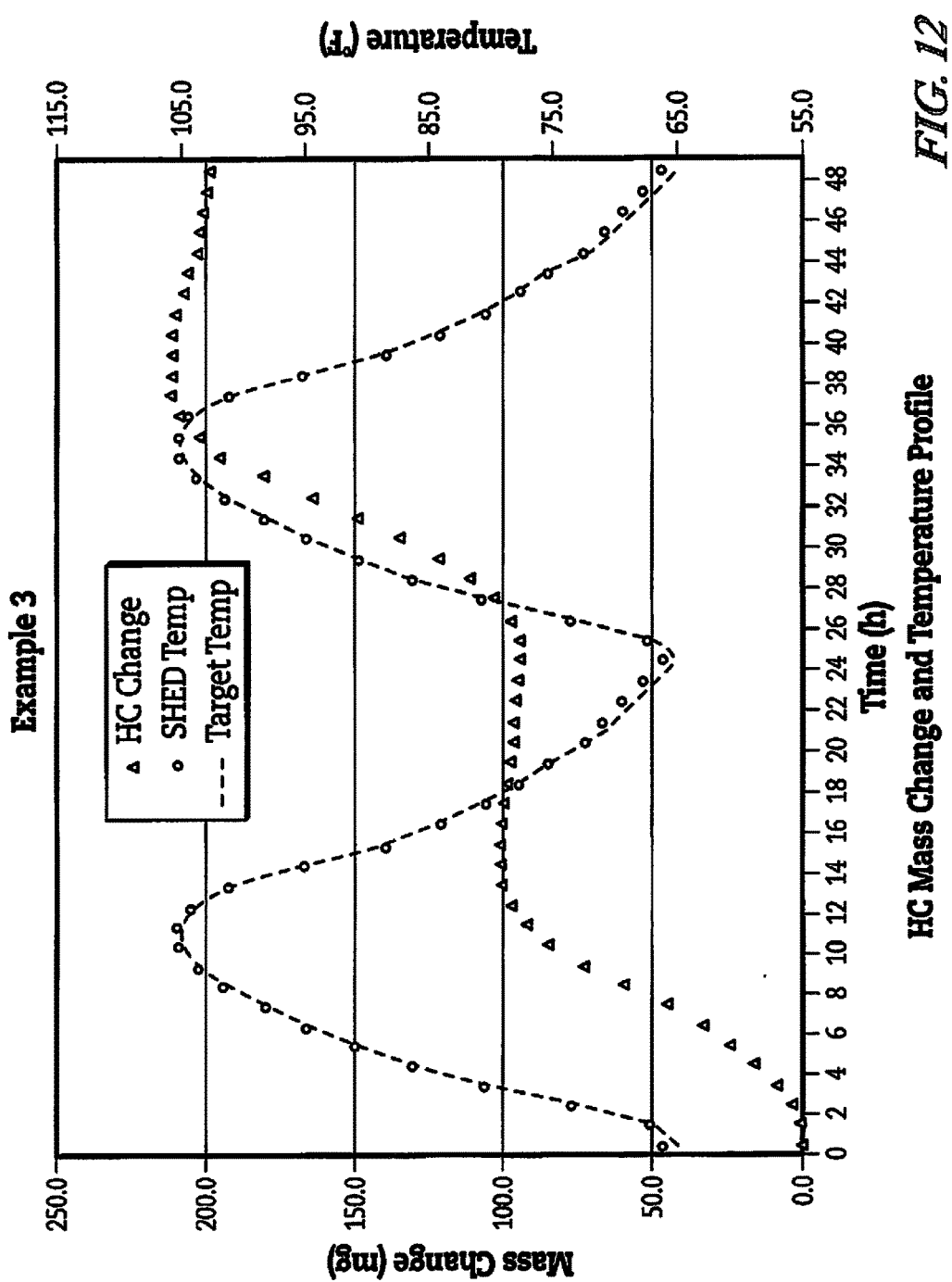
FIG. 12 is a chart showing the amount of hydrocarbon detected in a third exemplary test of a canister system having a primary recovery canister and a modular secondary recovery canister.
Figure 13:
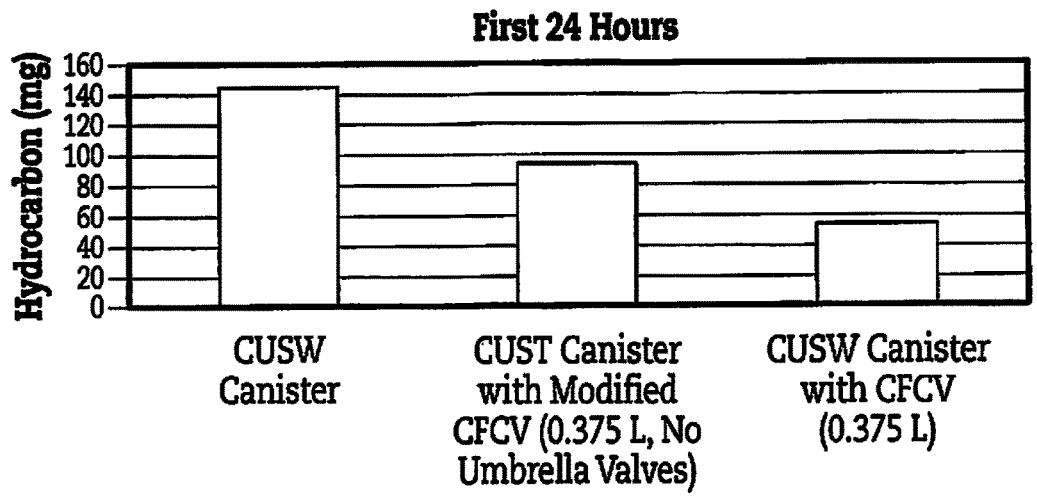
FIG. 13 is a bar chart showing the amount of hydrocarbon in exemplary test articles over 24 hours of testing.
Figure 14:
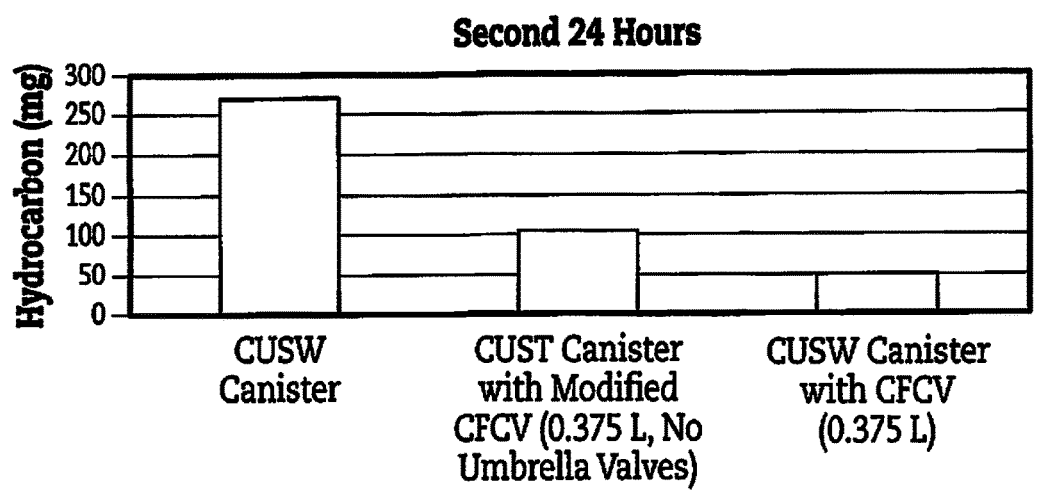
FIG. 14 is a bar chart showing the amount of hydrocarbon in exemplary test articles over 48 hours of testing.

Diurnal Bleed Test Results—Canister System Having a Primary Recovery Canister and a Modular Secondary Recovery Canister Example 3 tested the hydrocarbon capture performance of a canister system having a primary recovery canister (2.1 L of carbon) and a modular secondary recovery canister (0.375 L of low bleed carbon). The hydrocarbon capture performance of the canister system was evaluated as described above. The gained mass of the canister is shown in Table 3. The amount of hydrocarbon detected by the SHED can be seen in FIG. 12 and Table 4.

TABLE 3

Primary recovery canister (2.1 L of carbon) with modular secondary recovery canister (0.375 L) mass change. The mass of the Fuel Vapor Canister was measured during the process described above. The changes in mass from the initial weights were calculated.

|  | CUSW Weight gain from initial weight (g) | CFCV Weight gain from initial weight (g) |
| --- | --- | --- |
| After butane: $N_2$ load | 130.00 g (combined) | |
| After 150 BV purge | 34.81 | 2.68 |
| After 12 h equilibration | 35.80 | 2.78 |

Table 4 below compares the amount of hydrocarbon discharged by the canister systems of Examples 1-3.

TABLE 4

Amount of hydrocarbon emitted to the SHED over 48 hours

| Canister | First 24 hours (mg) | Second 24 hours (mg) | Total (mg) |
| --- | --- | --- | --- |
| Example 1 | 144.1 | 270.8 | 414.9 |
| Example 2 | 94.2 | 104.1 | 198.3 |
| Example 3 | 54 | 51 | 105 |

The invention claimed is:

1. A fuel vapor canister system adapted for use in a vehicle fuel system, the system comprising
a primary recovery canister adapted to capture and store hydrocarbons entrained in fuel vapors that are discharged from a fuel tank toward the atmosphere, the primary recovery canister including a primary filter bed housing and a first carbon bed contained in the primary filter bed housing, and
a modular secondary recovery canister fluidly coupled to the primary recovery canister and adapted to capture and store additional hydrocarbons entrained in fuel vapors that are discharged from a fuel tank during daily expansion of fuel/fuel vapor caused by heating of an associated fuel tank during the warm temperatures of the day, the modular secondary recovery canister including a second filter bed housing independent of the primary recovery canister and fluidly coupled to the primary recovery canister, a second carbon bed contained in the secondary filter bed housing, and flow-control means for controlling the movement of fuel vapor through the modular secondary recovery canister, the flow control means including a bypass valve that is configured to move to an opened position arranged to allow fuel vapor to pass along a first flow path from an inlet of the modular secondary filter bed housing to the atmosphere during refueling without passing through the second carbon bed from a normally closed position arranged to block fuel vapor from passing from the inlet of the modular secondary filter bed housing to the atmosphere without passing through the second carbon bed in response to movement of a fuel tank closure associated with the fuel tank to an opened configuration so that the second carbon bed remains substantially clean for use during normal operation of the fuel system.

2. A fuel vapor canister system adapted for use in a vehicle fuel system, the system comprising
a primary recovery canister adapted to capture and store hydrocarbons entrained in fuel vapors that are discharged from a fuel tank toward the atmosphere, the primary recovery canister including a primary filter bed housing and a first carbon bed contained in the primary filter bed housing, and
a modular secondary recovery canister fluidly coupled to the primary recovery canister and adapted to capture and store additional hydrocarbons entrained in fuel vapors that are discharged from a fuel tank during daily expansion of fuel/fuel vapor caused by heating of an associated fuel tank during the warm temperatures of the day, the modular secondary recovery canister including a second filter bed housing independent of the primary recovery canister and fluidly coupled to the primary recovery canister, a second carbon bed contained in the secondary filter bed housing, and a vapor flow controller including a bypass valve that is configured to move to an opened position arranged to allow fuel vapor to pass along a first flow path from an inlet of the modular secondary filter bed housing to the atmosphere during refueling without passing through the second carbon bed from a normally closed position arranged to block fuel vapor from passing from the inlet of the modular secondary filter bed housing to the atmosphere without passing through the second carbon bed, wherein the vapor flow controller includes a bleed orifice in fluid communication with the first carbon bed and the second carbon bed and the bleed orifice is sized to allow pressurized fuel vapor to move from the first carbon bed to the second carbon bed along a second flow path when the bypass valve is closed so that vapor discharged during daily expansion of fuel in the fuel tank.

3. The system of claim 2, wherein the vapor flow controller includes a one-way check valve configured to allow flow from the second carbon bed to the first carbon bed along a third flow path during purging when vacuum pulls atmospheric air into the fuel vapor canister system.

4. A fuel vapor canister system adapted for use in a vehicle fuel system, the system comprising
a primary recovery canister adapted to capture and store hydrocarbons entrained in fuel vapors that are discharged from a fuel tank toward the atmosphere, the primary recovery canister including a primary filter bed housing and a first carbon bed contained in the primary filter bed housing, and
a modular secondary recovery canister fluidly coupled to the primary recovery canister and adapted to capture and store additional hydrocarbons entrained in fuel vapors that are discharged from a fuel tank during daily expansion of fuel/fuel vapor caused by heating of an associated fuel tank during the warm temperatures of the day, the modular secondary recovery canister including a second filter bed housing independent of the primary recovery canister and fluidly coupled to the primary recovery canister, a second carbon bed contained in the secondary filter bed housing, and a vapor flow controller including a bypass valve that is configured to move to an opened position arranged to allow fuel vapor to pass along a first flow path from an inlet of the modular secondary filter bed housing to the atmosphere during refueling without passing through the second carbon bed from a normally closed position arranged to block fuel vapor from passing from the inlet of the modular secondary filter bed housing to the atmosphere without passing through the second carbon bed, wherein the bypass valve is a pressure-controlled valve configured to be opened when a fuel tank closure associated with the fuel vapor canister system is opened.

5. The system of claim 4, wherein the bypass valve includes a flexible diaphragm mounted in the modular secondary filter bed housing to divide a valve-receiving space into a lower portion and an upper portion, an outlet tube that extends from the valve-receiving space to an atmosphere-interface space, and a bias assembly that biases the flexible diaphragm toward contact with the outlet tube closing the outlet tube off from fluid communication with the valve-receiving space.

6. The system of claim 5, wherein the lower portion of the valve-receiving space is fluidly coupled with the primary recovery canister, the upper portion of the valve-receiving space is fluidly coupled to a valve-control port, and the valve control port is adapted to be coupled to atmospheric pressure when a fuel tank closure associated with the fuel vapor canister system is opened.

7. The system of claim 5, wherein the vapor flow controller includes a bleed orifice that fluidly couples the lower portion of the valve-receiving space with the second carbon bed, the second carbon bed is fluidly coupled to the atmosphere-interface space, and the bleed orifice sized to allow pressurized fuel vapor to move from the first carbon bed through the second carbon bed to the atmosphere-interface space along a second flow path when the bypass valve is closed.

8. The system of claim 5, wherein the modular secondary recovery canister is spaced apart from the primary recovery canister and is fluidly coupled to the primary recovery canister by a length of conduit that extends from the housing of the primary recovery canister to inlet port of the modular secondary filter bed housing.

9. The system of claim 8, wherein the inlet port of the second filter bed housing opens into the lower portion of the valve-receiving space provided by the modular secondary filter bed housing.

10. A fuel vapor canister system adapted for use in a vehicle fuel system, the system comprising
a primary recovery canister adapted to capture and store hydrocarbons entrained in fuel vapors that are discharged from a fuel tank toward the atmosphere, the primary recovery canister including a primary filter bed housing and a first carbon bed contained in the primary filter bed housing, and
a modular secondary recovery canister fluidly coupled to the primary recovery canister and adapted to capture and store additional hydrocarbons entrained in fuel vapors that are discharged from a fuel tank during daily expansion of fuel/fuel vapor caused by heating of an associated fuel tank during the warm temperatures of the day, the modular secondary recovery canister including a second filter bed housing independent of the primary recovery canister and fluidly coupled to the primary recovery canister, a second carbon bed contained in the secondary filter bed housing, and a vapor flow controller including a bypass valve that is configured to move to an opened position arranged to allow fuel vapor to pass along a first flow path from an inlet of the modular secondary filter bed housing to the atmosphere during refueling without passing through the second carbon bed from a normally closed position arranged to block fuel vapor from passing from the inlet of the modular secondary filter bed housing to the atmosphere without passing through the second carbon bed, wherein the first flow path bypassing the second carbon bed is coaxial with the second flow path through the second carbon bed contained in the second filter bed housing.

11. A modular secondary recovery canister adapted for optional use with a primary recovery canister in a fuel vapor recovery canister system, the modular secondary recovery canister comprising
a secondary filter bed housing defining an internal cavity divided into a carbon-receiving space, a valve-receiving space, and atmosphere-interfacing space,
a carbon bed including a plurality of carbon granules contained in the carbon-receiving space of the secondary filter bed housing, and
a vapor flow controller configured to control movement of fuel vapor from the valve-receiving space to the atmosphere-interfacing space, the vapor flow controller including a bypass valve configured to open and allow fuel vapor to pass along a first flow path from the valve-receiving space to the atmosphere-interface space without interacting with the carbon bed when the bypass valve is open and a bleed orifice formed in a wall that separates the valve-receiving space from the carbon-receiving space, the bleed orifice sized to allow fuel vapor to pass along a second flow path from the valve-receiving space through the carbon bed for interaction with the carbon bed to the atmosphere-interface space when the bypass valve is closed.

12. The modular secondary recovery canister of claim 11, wherein the vapor flow controller includes a one-way check valve configured to allow flow from the atmosphere-interface space through the second carbon bed to the valve-receiving space along a third flow path when vacuum applied to the valve-receiving space pulls atmospheric air into modular secondary recovery canister.

13. The modular secondary recovery canister of claim 12, wherein the one-way check valve includes an umbrella valve configured to selectively allow flow through at least one purge hole formed in the wall that separates the valve-receiving space from the carbon-receiving space.

14. The modular secondary recovery canister of claim 11, wherein the bypass valve is a pressure-controlled valve and includes a flexible diaphragm mounted in the modular secondary filter bed housing to divide the valve-receiving space into a lower portion and an upper portion, an outlet tube that extends from the valve-receiving space through the wall to the atmosphere-interface space, and a bias assembly that biases the flexible diaphragm toward contact with the outlet tube closing the outlet tube off from fluid communication with the valve-receiving space.

15. The modular secondary recovery canister of claim 14, wherein an inlet port adapted to be fluidly coupled to a primary recovery canister associated with the modular secondary recovery canister opens into the lower portion of the valve-receiving space, a valve-control port opens into the upper portion of the valve-receiving space, and the valve control port is adapted to be coupled to atmospheric pressure when a fuel tank closure associated with the modular secondary recovery canister is opened.

16. The modular secondary recovery canister of claim 14, wherein the outlet tube extends through the carbon receiving space and a portion of the outlet tube is surrounded by the plurality of carbon granules included in the carbon bed.

17. The modular secondary recovery canister of claim 16, wherein the first flow path through the outlet tube is coaxial with the second flow path through the carbon bed.

18. The modular secondary recovery canister of claim 11, wherein the first flow path through the outlet tube is coaxial with the second flow path through the carbon bed contained in the carbon-receiving space of the secondary filter bed housing.

19. A modular secondary recovery canister adapted for optional use with a primary recovery canister in a fuel vapor recovery canister system, the modular secondary recovery canister comprising
a secondary filter bed housing defining an internal cavity divided into a carbon-receiving space, a valve-receiving space, and atmosphere-interfacing space,
a carbon bed including a plurality of carbon granules contained in the carbon-receiving space of the secondary filter bed housing, and
a vapor flow controller configured to control movement of fuel vapor from the valve-receiving space to the atmosphere-interfacing space, the vapor flow controller including a bypass valve configured to open and allow fuel vapor to pass along a first flow path from the valve-receiving space to the atmosphere-interface space without interacting with the carbon bed when the bypass valve is open, wherein the bypass valve is a pressure-controlled valve configured to be opened when a fuel tank closure associated with the fuel vapor canister system is opened.

20. The modular secondary recovery canister of claim 19, wherein the bypass valve includes a flexible diaphragm mounted in the modular secondary filter bed housing to divide a valve-receiving space into a lower portion and an upper portion, an outlet tube that extends from the valve-receiving space and fluidly couples the valve-receiving space with the atmosphere, and a bias assembly that biases the flexible diaphragm toward a position closing the outlet tube off from fluid communication with the valve-receiving space.

21. The modular secondary recovery canister of claim 19, wherein the vapor flow controller includes a one-way check valve configured to allow flow from the atmosphere through the second carbon bed to the valve-receiving space along a third flow path when vacuum applied to the second carbon bed pulls atmospheric air into modular secondary recovery canister.

22. A modular secondary recovery canister adapted for optional use with a primary recovery canister in a fuel vapor recovery canister system, the modular secondary recovery canister comprising a secondary filter bed housing defining an internal cavity divided into a carbon-receiving space, a valve-receiving space, and atmosphere-interfacing space, a carbon bed including a plurality of carbon granules contained in the carbon-receiving space of the secondary filter bed housing, and a vapor flow controller configured to control movement of fuel vapor from the valve-receiving space to the atmosphere-interfacing space, the vapor flow controller including a bypass valve configured to open and allow fuel vapor to pass along a first flow path from the valve-receiving space to the atmosphere-interface space without interacting with the carbon bed when the bypass valve is open, wherein the first flow path bypassing the second carbon bed is coaxial with a second flow path through the second carbon bed contained in the second filter bed housing.

* * * * *